United States Patent

[11] 3,556,203

[72] Inventor William K. Kyle
Staunton, Va.
[21] Appl. No. 807,610
[22] Filed Mar. 17, 1969
[45] Patented Jan. 19, 1971
[73] Assignee Westinghouse Electric Corporation
Pittsburgh, Pa.
a corporation of Pennsylvania

[54] TEMPERATURE CONTROL SYSTEM
12 Claims, 14 Drawing Figs.
[52] U.S. Cl. .................................................... 165/29
[51] Int. Cl. .................................................. F25b 29/00
[50] Field of Search .......................................... 165/29, 30, 62

[56] References Cited
UNITED STATES PATENTS
2,806,674 9/1957 Biehn .......................... 165/29

Primary Examiner—Charles Sukalo
Attorney—F. H. Henson

ABSTRACT: A heat pump is controlled during air heating operation by a two-stage thermostat having its switches biased towards open positions. When the first stage switch closes, it starts the compressor of the heat pump, and adjusts the reversal valve of the heat pump to its heat position so that the indoor coil of the heat pump operates as a condenser coil to heat indoor air. When the second stage switch closes, it turns on a booster air heater, and removes the bias, moving the closing temperature of the second stage switch up to that of the first stage switch.

The heat pump is controlled during air cooling operation by a second two-stage thermostat. When the first stage switch of the second thermostat closes, it starts the compressor with one cylinder unloaded. The indoor coil operates as an evaporator coil to cool the indoor air. When the switch of the second stage of the second thermostat closes, it loads the unloaded compressor cylinder, and biases the switches of the second thermostat towards closed positions, moving the closing temperature of the second stage switch of the second thermostat down to that of the first stage switch of the second thermostat.

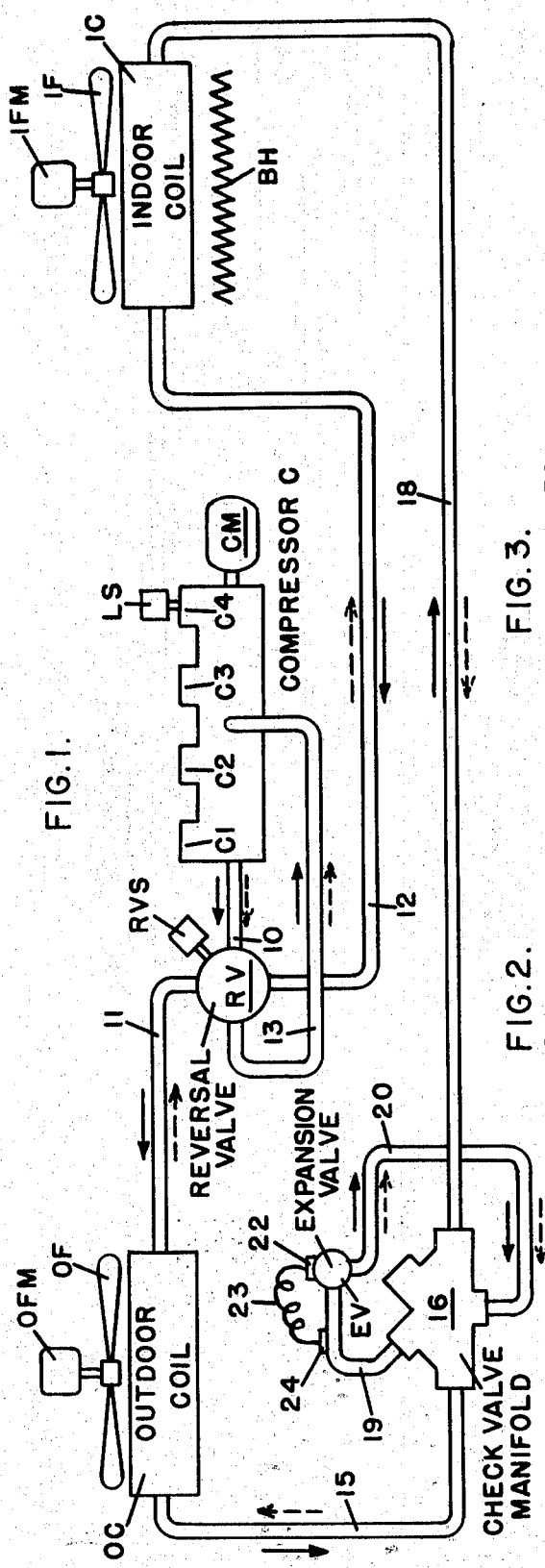

TEMPERATURE CONTROL SYSTEM

BACKGROUND OF THE INVENTION

The field of the invention is space heating and cooling systems which use two-stage, heat control thermostats, and two-stage cool control thermostats. The first stage switch of a heat control thermostat turns on heat at a temperature which may be 72° F. The second stage switch of the heat control thermostat turns on additional heat when the temperature has dropped about 2° F. below the control temperature of the first stage switch of the heat control thermostat, so that it is about 2° F. colder during control by the second stage switch of the heat control thermostat than during control by the first stage switch of the latter. The first stage switch of a cool control thermostat provides cooling at a temperature which may be 74° F. The second stage switch of the cool control thermostat provides additional cooling when the temperature has increased about 2° F. above the control temperature of the first stage switch of the cool control thermostat, so that it is about 2° F. hotter during control by the second stage switch of the cool control thermostat than during control by the first stage switch of the latter.

SUMMARY OF THE INVENTION

A heat pump is controlled during air heating operation by a two-stage thermostat having a heater resistor normally energized by a normally closed switch of a normally deenergized relay. The heater resistor biases the switches of the thermostat towards open positions. When the first stage switch closes at, for example, 72° F., it starts the compressor of the heat pump, energizes a solenoid which adjusts the reversal valve of the heat pump to its heat position, and partially energizes the relay. When the second stage switch closes at, for example, 70° F., it energizes an electric booster heater, and completes the energization of the relay. The switch of the latter opens, and deenergizes the heater resistor, removing the bias on the first and second stage switches so that they close at, for example, 74° F. and 72° F. respectively. When the second stage switch opens, the relay remains energized until the first opening thereafter of the first stage switch.

The heat pump is controlled during air cooling operation by a second two-stage thermostat having a second, normally deenergized resistor heater adapted to be energized by a normally open switch, when closed, of a normally deenergized, second relay. When the first stage switch of the second thermostat closes at, for example, 74° F., it turns on the compressor, one cylinder of which is unloaded, and partially energizes the second relay. When the second stage switch of the second thermostat closes at, for example, 76° F., it energizes a solenoid which loads the unloaded compressor cylinder, and completes the energization of the second relay. The latter closes its switch, energizing the second heater resistor which biases the switches of the second thermostat towards closed positions so that the first stage switch of the latter closes at 72° F., and its second stage switch closes at a 74° F. The second relay remains energized until the first opening thereafter of the first stage switch of the second thermostat.

BRIEF DESCRIPTION OF THE DRAWINGS

FIG. 1 is a diagrammatic view of a heat pump embodying this invention;

FIG. 2 is a diagrammatic view of the two-stage, heat control thermostat used;

FIG. 3 is a diagrammatic view of the two-stage, cool control thermostat used;

FIG. 4 is a diagrammatic view of the compressor motor starter;

FIG. 5 is a diagrammatic view of the heat relay;

FIG. 6 is a diagrammatic view of the heat control relay;

FIG. 7 is a diagrammatic view of the booster heat relay;

FIG. 8 is a diagrammatic view of the cool relay;

FIG. 9 is a diagrammatic view of the cool control relay;

FIG. 11 is a time-temperature chart showing the heat operation of the heat pump as it would be without the use of this invention;

FIG. 12 a chart similar to that of FIG. 11, showing the heat operation of the heat pump using this invention;

FIG. 13 is a time-temperature chart showing the cooling operation of the heat pump as it would be without the use of this invention, and FIG. 14 is a view similar to that of FIG. 13, showing the cooling operation of the heat pump using this invention.

DESCRIPTION OF THE PREFERRED EMBODIMENT

Figure 10:
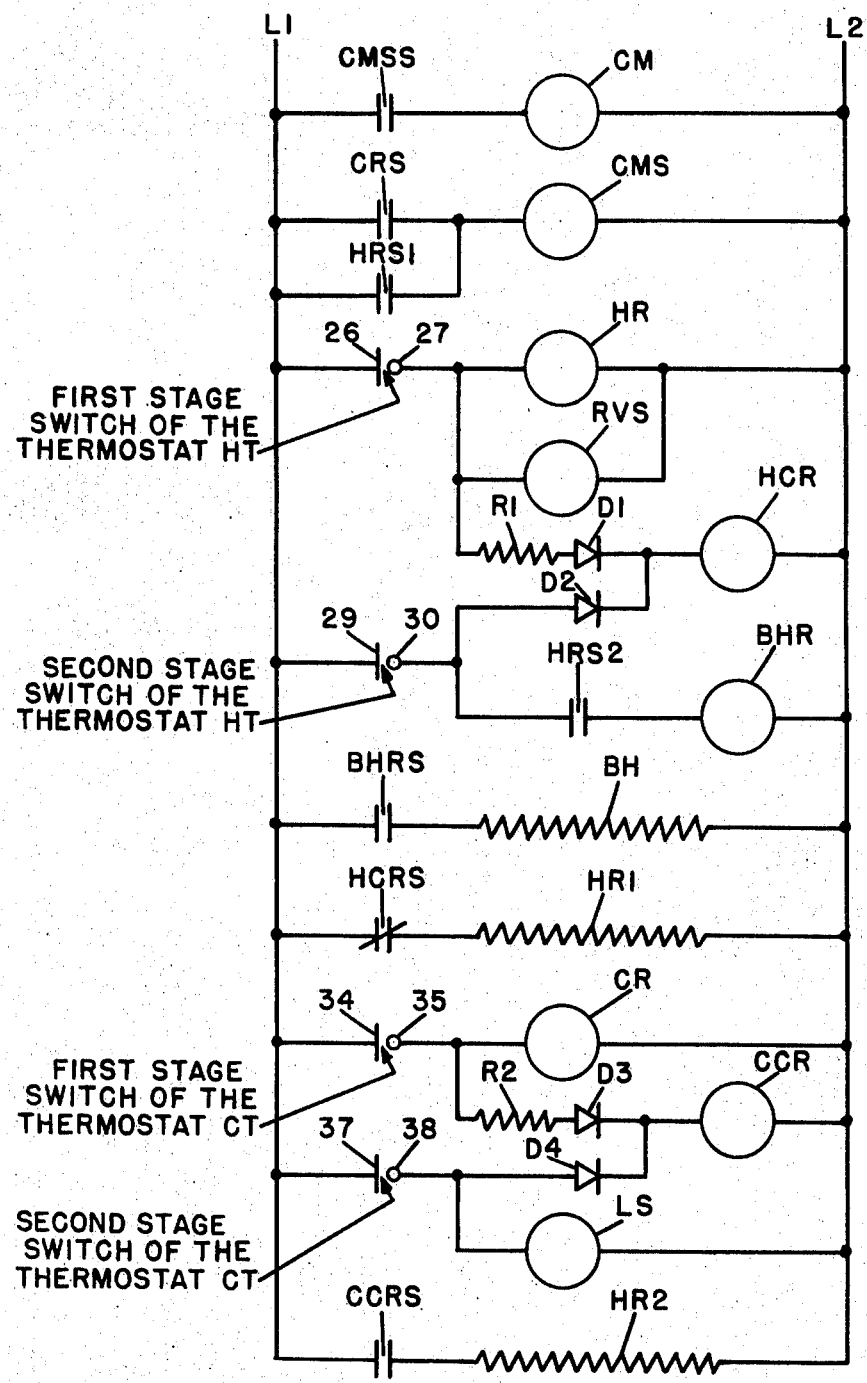
FIG. 10 is a simplified circuit schematic of the electric controls of the heat pump.

Referring first to FIG. 1 of the drawings, a refrigerant compressor C having cylinders C1, C2, C3 and C4, is driven by electric motor CM. The cylinder C4 is normally unloaded by a conventional unloader (not shown) adjustable to load-unload positions by solenoid LS. The outlet of the compressor C is connected by discharge gas tube 10 to a conventional reversal valve RV adjustable by a solenoid RVS. The valve RV is connected by tube 11 to outdoor coil OC, by tube 12 to indoor coil IC, and by suction gas tube 13 to the inlet of the compressor C. The outdoor coil OC is connected by tube 15 to check valve manifold 16 which is connected by tube 18 to the indoor coil IC, by tube 19 to the inlet of expansion valve EV, and by tube 20 to the outlet of the valve EV. Fan OF driven by electric motor OFM moves outdoor air over the surface of the coil OC. Fan IF driven by electric motor IFM moves indoor air over the surface of the coil IC. An electric booster heater BH is located adjacent to and downstream with respect to airflow of the indoor coil IC.

The manifold 16 is that disclosed in detail in the U.S. Pat. No. 3,299,661 of J. R. Harnish and R. W. Ayling.

The expansion valve EV is a subcooling control valve disclosed in detail in the U.S. Pat. No. 3,367,130 of A. Owens. It has a diaphragm chamber 22 connected by capillary tube 23 to thermal bulb 24 in heat exchange contact with the tube 19.

Referring now to FIG. 2, heat control thermostat HT has a conventional, first stage, bimetallic coil 25 with a switch arm 26 opposite switch contact 27, and has a conventional, second stage bimetallic coil 28 with a switch arm 29 opposite switch contact 30. A case 31 extends around the thermostat HT, and within the case 31 below the coils 25 and 28 is an electric heater resistor HR1.

Referring now to FIG. 3, cool control thermostat CT has a conventional, first stage bimetallic coil 33 with a switch arm 34 opposite switch contact 35, and has a conventional, second stage, bimetallic coil 36 with a switch arm 37 opposite switch contact 38. A case 39 extends around the thermostat CT, and within the case 39 below the coils 33 and 36 is an electric heater resistor HR2.

Referring now to FIGS. 4—9, compressor motor starter CMS has a switch CMSS which closes when the starter CMS is energized; heat relay HR has switches HRS1 and HRS2 which close when the relay HR is energized; heat control relay HCR has a normally closed switch HCRS which opens when the relay HCR is energized; booster heat relay BHR has a switch BHRS which closes when the relay BHR is energized; cool relay CR has a switch CRS which closes when the relay CR is energized, and cool control relay CCR has a switch CCRS which closes when the relay CCR is energized.

The relays HCR and CCR are bireed relays manufactured by RBM controls, a Division of Essex Wire Co., Logansport, Ind.

Referring now to FIG. 10, the compressor motor CM is connected in series with the starter switch CMSS to electric supply lines L1 and L2; the starter CMS is connected in series with the switch CRS of the cool relay CR to the lines L1 and L2, and in series with the switch HRS1 of the heat relay HR to the lines L1 and L2; the heat relay HR and the solenoid RVS are connected in parallel, and in series with the thermostat arm 26 and its switch contact 27 to the lines L1 and L2; the heat control relay HCR is connected in series with diode D1, resistor R1, the switch contact 27 and the switch arm 26 to the lines L1 and L2, and in series with diode D2, the switch contact 30 and the switch arm 29 to the lines L1 and L2; the booster heat relay BHR is connected in series with the switch HRS2, the switch contact 30 and the switch arm 29 to the lines L1 and L2; the booster heat resistor BH is connected in series with the switch BHRS to the lines L1 and L2; the heater resistor HR1 is connected in series with the switch HCRS to the lines L1 and L2; the cool relay CR is connected in series with the switch contact 35 and the switch arm 34 to the lines L1 and L2; the cool control relay CCR is connected in series with diode D3 and resistor R2, the switch contact 35 and the switch arm 34 to the lines L1 and L2, and in series with diode D4, the switch contact 38 and the switch arm 37 to the lines L1 and L2; the solenoid LS is connected in series with the switch contact 38 and the switch arm 37 to the lines L1 and L2, and the heater resistor HR2 is connected in series with the switch CCRS of the relay CCR to the lines L1 and L2,

HEATING OPERATION

The dashed line arrows alongside the tubing of FIG. 1 show the direction of refrigerant flow during heating operation. The heater resistor HR1 is normally energized by the normally closed switch HCRS so that the thermostat coils 25 and 28 are heated to about 2° F. above room temperature, biasing the switch arms 26 and 29 towards open positions. When the first stage switch of the thermostat HT calls for heat at, for example, 72° F., the switch arm 26 moves against its contact 27, energizing the heat relay HR and the solenoid RVS. The relay HR closes its switches HRS1 and HRS2. The closed switch HRS1 energizes the compressor motor starter CMS which closes its switch CMSS, starting the compressor motor CM. The starters for the fan motors OFM and IFM are not shown since as is conventional the fan motors would be energized when the compressor motor is energized. The solenoid RVS adjusts the reversal valve RV to its heat position. The movement of the switch arm 26 against its contact 27 also supplies current from the lines L1 and L2 through the resistor R1 and the diode D1 into the relay HCR, but the resistor R1 reduces this current below the energizing current of the relay HCR but above its dropout current so that when it is fully energized as will be described later, it will remain energized until it is completely deenergized by the switch arm 26 moving away from the contact 27.

The compressor C supplies discharge gas through the tube 10, the reversal valve RV and the tube 12 into the indoor coil IC operating as a condenser coil to heat the indoor air. Liquid flows from the coil IC through the tube 18 into the manifold 16, and from the latter through the tube 19 into the expansion valve EV. Expanded refrigerant flows from the valve EV through the tube 20 into the manifold 16, and from the latter through the tube 15 into the outdoor coil OC operating as an evaporator coil. Refrigerant flows from the coil OC through the tube 11, the reversal valve RV and the tube 13 to the suction side of the compressor C.

If the heat provided by the indoor coil IC is insufficient, and the room temperature drops to, for example, 70° F., the second stage switch arm 29 moves against its switch contact 30, energizing through the now closed switch HRS2 of the heat relay HR, the booster heat relay BHR which closes its switch BHRS, energizing the booster heater BH. At the same time, current flows through the switch arm 29, its contact 30 and the diode D2 into the relay HCR, completing the energization thereof. The relay HCR opens its switch HCRS, deenergizing the heater resistor HR1 of the thermostat HT, causing the temperature within the case 31 of the latter to decrease about 2° F. The resultant cooling of the second stage thermostat coil 28 causes its switch arm 29 to remain in contact with the switch contact 30 until the room temperature increases to 72° F. instead of to 70° F.

When the second stage of the thermostat HT is satisfied, its switch arm 29 moves away from its contact 30, deenergizing the booster heat relay BHR, but the relay HCR remains energized through the current supplied through the diode D1, the resistor R1, the switch contact 27 and the first stage switch arm 26, so that the second stage switch can cycle the booster heater BH at 72° F. while the first stage switch is closed.

When the first stage of the thermostat is satisfied at 74° F. since its set point was moved upwardly when the set point of the second stage switch was moved upwardly when the switch HCRS opened and deenergized the heater resistor HR1, the switch arm 26 moves away from the switch contact 27, deenergizing the heat relay HR, the reversal valve solenoid RVS and the relay HCR. The heat relay HR opens its switches HRS1 and HRS2. The now open switch HRS1 deenergizes the compressor motor starter CMS which opens its switch CMSS, stopping the compressor motor CM. The now open switch HRS2 disconnects the booster heat relay BHR from the switch contact 30. The now deenergized relay HCR closes its switch HCRS, reenergizing the heater resistor HR1 which heats the thermostat coils 25 and 28, restoring the operating points of the first and second stage switches of the thermostat to 72° F. and 70° F., respectively. Thereafter, until the second stage switch of the thermostat HT again closes, the first stage switch cycles at 72° F.

While but one booster heater has been disclosed, other booster heaters controlled as disclosed in the U.S. Pat. No. 2,806,674 of G. L. Biehn, or in the copending application, Ser. No. 695,243, filed Jan. 2, 1968, of W. K. Kyle and E. H. Jensen.

Figures 11, 12, 13, 14:
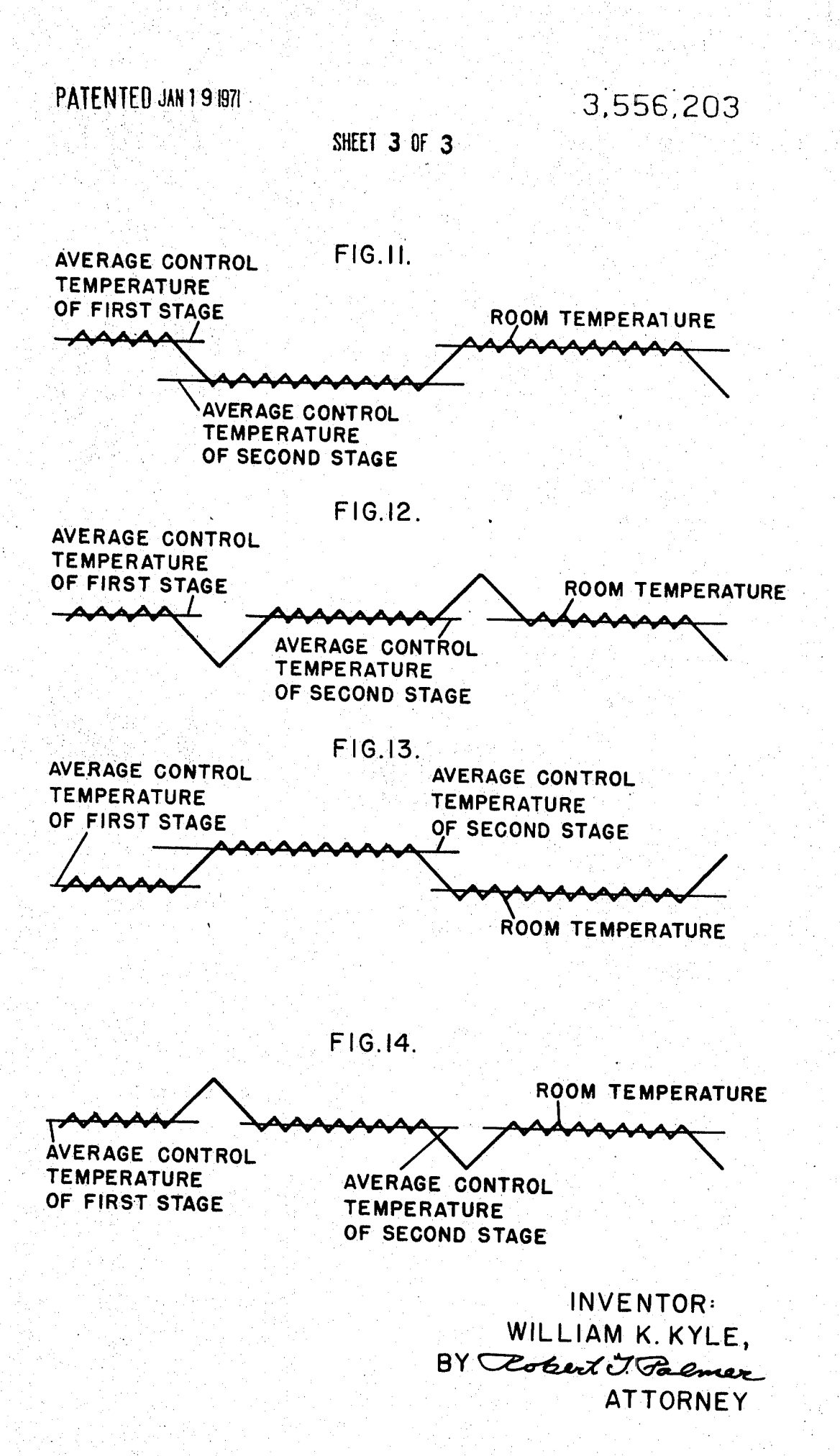

FIG. 11 shows the heat fluctuations without the use of this invention, and FIG. 12 shows the heat fluctuations using this invention.

COOLING OPERATION

The solid-line arrows alongside the tubing of FIG. 1 shows the direction of refrigerant flow during cooling operation. The heater resistor HR2 of the cool thermostat CT is normally deenergized so that normally there is no offset of its first and second stage switches. When the first stage of the thermostat CT calls for cooling at, for example, 74° F., its switch arm 34 moves against its contact 35, energizing the cool relay CR, and supplying current through the resistor R2 and the diode D3 through the cool control relay CCR, which current is insufficient to energize the latter. The relay CR closes its switch CRS, energizing the compressor motor starter CMS which closes its switch CMSS, starting the compressor motor CM. Discharge gas flows from the compressor C through the tube 10, the reversal valve RV, and the tube 11 into the outdoor coil OC operating as a condenser coil. Liquid flows from the coil OC through the tube 15 into the manifold 16, and from the latter through the tube 19 into the inlet of the expansion valve EV, and from the outlet of the latter, through the tube 20 into the manifold 16, and from the latter through the tube 18 into the indoor coil IC operating as an evaporator coil to cool the indoor air. Refrigerant flows from the coil IC through the tube 12, the reversal valve RV, and the tube 13 to the suction side of the compressor C. If the cooling provided by the coil IC is insufficient, and the indoor temperature increases to, for example, 76° F., the second stage switch arm 37 of the cool thermostat CT moves against its contact 38, energizing the solenoid LS which loads the compressor cylinder C4, increasing the capacity of the compressor C, and providing additional cooling by the indoor coil IC. The movement of the switch arm 37 against the contact 38 also supplies additional current through the diode D4 into the cool control relay CCR energizing the latter which closes its switch CCRS, energizing the heater resistor HR2 of the thermostat CT. Heat from the resistor HR2 biases the switch arm 37 towards contact 38, causing it to remain in contact with the contact 38 until the room temperature decreases to 74° F., the setting of the first stage switch of the thermostat CT before the relay CCR was energized. Heat from the resistor HR2 also biases the first stage switch arm 34 towards its contact 35, resetting the first stage switch of the thermostat CT to 72° F. operation where it cycles only once since its first opening deenergizes the relay CCR which opens its contact CCRS, deenergizing the heater resistor HR2. The relay CCR remains energized during the cycling of the second stage switch of the thermostat CT. When the second stage switch of the thermostat CT is satisfied, the second stage switch arm 37 moves away from its contact 38, opening the energizing circuit of the solenoid LS, unloading the compressor cylinder C4, and discontinuing the supply of current through the diode D4 into the relay CCR which, however, remains energized until the first opening of the first stage switch of the thermostat CT. When the first stage switch of the thermostat CT is satisfied, it deenergizes the compressor motor starter CMS which opens its switch CMSS, stopping the compressor motor CM, and deenergizes the relay CCR which opens its switch CCRS which deenergizes the heater resistor HR2, restoring the settings of the switches of the thermostat CT to their original settings.

FIG. 13 shows the temperature fluctuations during cooling operation without the use of this invention, and FIG. 14 shows the temperature fluctuations during cooling operation using this invention.

I claim:

1. A temperature control system comprising:
first means for heating indoor air;
second means for increasing the heating of said air;
a two-stage, heat control thermostat having a first stage switch, and a second stage switch;
first, normally active, bias means for moving said switches towards open positions;
means including said first stage switch, when closed, for energizing said first means;
means including said second stage switch, when closed, for energizing said second means;
means including said first and second stage switches, when closed, for making said bias means inactive, and for maintaining said bias means inactive until said first stage switch opens;
third means for cooling said air;
fourth means for increasing the cooling of said air;
a two-stage, cool control thermostat having a first stage switch, and a second stage switch;
second, normally inactive, bias means for moving, when active, said switches of said cool control thermostat towards closed positions;
means including said first stage switch of said cool control thermostat, when closed, for energizing said third means;
means including said second stage switch of said cool control thermostat, when closed, for energizing said fourth means; and
means including said first and second stage switches of said cool control thermostat, when closed, for making said second bias means active, and for maintaining said second bias means active until said first stage switch of said cool control thermostat opens.

2. A system as claimed in claim 1 in which:
said first bias means comprises a normally energized heater resistor; and
said second bias means comprises a normally deenergized heater resistor.

3. A system as claimed in claim 2 in which:
said system has electric supply lines;
said first bias means comprises a normally deenergized relay having a normally closed switch connecting said normally energized resistor to said lines; and
said second bias means comprises a normally deenergized relay having a normally open switch for connecting, when closed, said normally deenergized resistor to said lines.

4. A heat pump comprising:
a refrigerant compressor having an electric driving motor;
an outdoor heat exchange coil;
an indoor heat exchange coil;
refrigerant expansion means;
means, when air heating is required, for routing refrigerant from said compressor through said indoor coil operating as a condenser coil, and said expansion means, into said outdoor coil operating as an evaporator coil, and, when air cooling is required, for routing refrigerant from said compressor through said outdoor coil operating as a condenser coil, and said expansion means, into said indoor coil operating as an evaporator coil;
an electric booster heater adjacent to said indoor coil;
a two-stage, heat control thermostat having a first stage switch, and a second stage switch;
first, normally active, bias means for moving said switches towards open positions;
electric supply lines;
means including said first switch, when closed, for connecting said motor to said connections;
means including said first and second switches, when closed, for connecting said heater to said lines, for making inactive said bias means, and for maintaining said bias means inactive until said first switch opens;
electrically operated means for increasing the output of said compressor;
a two-stage, cool control thermostat having a first stage switch, and a second stage switch;
second, normally inactive, bias means for moving when made active, said switches of said cool control thermostat towards closed positions;
means including said first switch, when closed, of said cool control thermostat for connecting said motor to said lines; and
means including said switches, when closed, of said cool control thermostat for connecting said electrically operated means to said lines, for making active said second bias means, and for maintaining said second bias means active until said first switch of said cool control thermostat opens.

5. A heat pump as claimed in claim 4 in which:
said first bias means comprises a normally energized heater resistor; and
said second bias means comprises a normally deenergized heater resistor.

6. A heat pump as claimed in claim 5 in which:
said first bias means comprises a normally deenergized relay having a normally closed switch connecting said normally energized resistor to said lines; and
said second bias means comprises a normally deenergized relay having a normally open switch for connecting, when closed, said normally deenergized resistor to said lines.

7. A heat pump comprising:
a refrigerant compressor having an electric driving motor;
an indoor heat exchange coil connected to the discharge side of said compressor so as to operate as a condenser coil to heat indoor air;
refrigerant expansion means connected to said coil;
an outdoor heat exchange coil connected to said expansion means and to the suction side of said compressor so as to operate as an evaporator coil;
an indoor thermostat having a first stage switch, and a second stage switch;
normally active bias means for moving said switches towards open positions;
electric supply lines;
means including said first switch, when closed, for connecting said motor to said lines;
an electric booster heater adjacent to said indoor coil; and
means including said switches, when closed, for connecting said booster heater to said lines, for making said bias means inactive, and for maintaining said bias means inactive until said first switch opens.

8. A heat pump as claimed in claim 7 in which: said bias means comprises a normally energized heater resistor.

9. A heat pump as claimed in claim 8 in which said bias means comprises a normally deenergized relay having a normally closed switch connecting said normally energized resistor to said lines.

10. A heat pump comprising:
a refrigerant compressor having an electric driving motor;
an outdoor heat exchange coil connected to the discharge side of said compressor so as to operate as a condenser coil;
refrigerant expansion means;
an indoor heat exchange coil connected to said expansion means and to the suction side of said compressor so as to operate as an evaporator coil to cool indoor air;
an indoor thermostat having a first stage switch, and a second stage switch;
normally inactive bias means for moving said switches, when made active, towards closed positions;
electric supply lines;
means including said first switch, when closed, for connecting said motor to said lines;
electrically operated means for increasing the output of said compressor; and
means including said switches, when closed, for connecting said electrically operated means to said lines, for making active said bias means, and for maintaining said bias means active until said first switch opens.

11. A heat pump as claimed in claim 10 in which: said bias means comprises a normally deenergized heater resistor.

12. A heat pump as claimed in claim 11 in which: said bias means comprises a normally deenergized relay having a normally open switch for connecting, when closed, said heater resistor to said lines.